US012807175B2

(12) United States Patent
Ichinokawa

(10) Patent No.: US 12,807,175 B2

(45) Date of Patent: Nov. 24, 2026

(54) MOBILE TERMINAL, CONTROL METHOD THEREOF, SYSTEM, AND STORAGE MEDIUM

(71) Applicant: HONDA MOTOR CO., LTD., Tokyo (JP)

(72) Inventor: Jumpei Ichinokawa, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 98 days.

(21) Appl. No.: 19/049,320

(22) Filed: Feb. 10, 2025

(65) Prior Publication Data

US 2025/0263088 A1 Aug. 21, 2025

(30) Foreign Application Priority Data

Feb. 21, 2024 (JP) ................................ 2024-024765

(51) Int. Cl.

*B60W 50/14* (2020.01)

*B60K 35/28* (2024.01)

(Continued)

(52) U.S. Cl.

CPC ............ *B60W 50/14* (2013.01); *B60K 35/28* (2024.01); *B60K 35/81* (2024.01); *B60W 40/09* (2013.01);

(Continued)

(58) Field of Classification Search

CPC ................ B60W 50/14; B60W 40/09; B60W 2050/146; B60W 2520/105;

(Continued)

(56) References Cited

U.S. PATENT DOCUMENTS 10,204,462 B2 2/2019 Isomura et al.
2010/0112529 A1 5/2010 Miura (Continued)

FOREIGN PATENT DOCUMENTS

JP 2009-157685 A 7/2009
JP 5057167 B2 10/2012

(Continued)

OTHER PUBLICATIONS

Yuki and Misato, Good_Drive . . . is the option. Ready!, Minkara "From S2000 through S660. Now black Vezel e:HEV and N-Box!", Oct. 19, 2023, https://minkara.carview.co.jp/userid/429298/blog/47288508/.

Japanese Office Action for Japanese Patent Application No. 2024-024765 mailed Jan. 30, 2026 (partially translated).

Japanese Office Action for Japanese Patent Application No. 2024-024765 mailed Aug. 4, 2025 (partially translated).

*Primary Examiner* — Brian A Zimmerman

*Assistant Examiner* — Cal J Eustaquio

(74) *Attorney, Agent, or Firm* — Thomas Horstemeyer, LLP

(57) ABSTRACT

A non-transitory computer-readable storage medium comprising a program executed on a mobile terminal used for safe driving support related to driving of a vehicle and is associated with an individual driver. The mobile terminal acquires acceleration detected by a sensor of the mobile terminal disposed in a vehicle or a sensor provided in the vehicle as acceleration of the vehicle while driving, determines a rank related to a risk level of driving by a driver of the vehicle on the basis of acceleration of the vehicle. The mobile terminal causes a display to show a display according to the determined rank.

12 Claims, 7 Drawing Sheets

(51) Int. Cl.
*B60K 35/81* (2024.01)
*B60W 40/09* (2012.01)
*H04W 4/02* (2018.01)
*H04W 4/029* (2018.01)

(52) U.S. Cl.
CPC ........... *H04W 4/027* (2013.01); *H04W 4/029* (2018.02); *B60K 2360/1876* (2024.01); *B60K 2360/188* (2024.01); *B60K 2360/566* (2024.01); *B60K 2360/589* (2024.01); *B60W 2050/146* (2013.01); *B60W 2520/105* (2013.01); *B60W 2530/18* (2013.01); *B60W 2556/10* (2020.02); *B60W 2556/50* (2020.02)

(58) Field of Classification Search
CPC ......... B60W 2530/18; B60W 2556/10; B60W 2556/50; B60K 35/28; B60K 35/81; B60K 2360/1876; B60K 2360/188; B60K 2360/566; B60K 2360/589; H04W 4/027; H04W 4/029
See application file for complete search history.

(56) References Cited

U.S. PATENT DOCUMENTS

| | | | | |
|---|---|---|---|---|
| 2013/0166170 | A1* | 6/2013 | Hunt .................... | G09B 19/167 701/99 |
| 2017/0144671 | A1* | 5/2017 | Memani ................ | B60W 40/09 |
| 2025/0263089 | A1 | 8/2025 | Ichinokawa | |

FOREIGN PATENT DOCUMENTS

| | | | | |
|---|---|---|---|---|
| JP | 2012-213492 | A | 11/2012 | |
| JP | 2013-057321 | A | 3/2013 | |
| JP | 2013-060867 | A | 4/2013 | |
| JP | 2014-130301 | A | 7/2014 | |
| JP | 2015-041120 | A | 3/2015 | |
| JP | 2017-182451 | A | 10/2017 | |
| JP | 2019-162338 | A | 9/2019 | |
| JP | 2025-127836 | A | 9/2025 | |
| WO | WO-2016200762 | A1 * | 12/2016 | ........... G08G 1/0141 |

* cited by examiner

MOBILE TERMINAL, CONTROL METHOD THEREOF, SYSTEM, AND STORAGE MEDIUM

CROSS-REFERENCE TO RELATED APPLICATION(S)

This application claims priority to and the benefit of Japanese Patent Application No. 2024-024765, filed Feb. 21, 2024, the entire disclosure of which is incorporated herein by reference.

BACKGROUND OF THE INVENTION

Field of the Invention

The present invention relates to a mobile terminal, a control method thereof, a system, and a storage medium.

Description of the Related Art

Conventionally, a safe driving evaluation system that improves the driver's consciousness of refraining from a sudden braking operation has been known (Japanese Patent No. 5057167). A safe driving evaluation system according to Japanese Patent No. 5057167 discloses a technique for counting the number of times of braking operations by a driver of a vehicle, and evaluating the driver's driving in accordance with the ratio of sudden braking in his or her braking operations and validity of the sudden braking.

In the technique described in Japanese Patent No. 5057167, a navigation system incorporated in the vehicle acquires information on the brake operations, and evaluates the driving on the basis of the braking operations. In order to evaluate the driving of individual drivers using the navigation system incorporated in the vehicle, the navigation system needs to identify who is driving. That is, the navigation system needs to perform processing of identifying the driver, such as requesting the driver to log in, every time the driver gets into the vehicle. It may be troublesome for the driver to perform an operation or an action for identifying the driver each time that he or she gets into the vehicle, and therefore driving may be performed without identifying the individual driver.

SUMMARY OF THE INVENTION

The present invention has been made in view of the above problem, and provides a technique that enables easy evaluation of driving of a vehicle by a driver.

In order to solve the aforementioned issues, one aspect of the present disclosure provides a non-transitory computer-readable storage medium comprising a program executed on a mobile terminal, wherein: the program is a program for safe driving support related to driving of a vehicle; the mobile terminal is associated with an individual driver; and the mobile terminal comprises: one or more processors; and a memory storing instructions which, when the instructions are executed by the one or more processors, cause the mobile terminal to function as: an acquisition unit configured to acquire acceleration detected by a sensor of the mobile terminal disposed in a vehicle or a sensor provided in the vehicle as acceleration of the vehicle while driving, a determination unit configured to determine a rank related to a risk level of driving by a driver of the vehicle on the basis of acceleration of the vehicle, and a display control unit configured to cause a display to show a display according to the determined rank.

Another aspect of the present disclosure provides a mobile terminal used for safe driving support related to driving of a vehicle and associated with an individual driver, the mobile terminal comprising: one or more processors; and a memory storing instructions which, when the instructions are executed by the one or more processors, cause the mobile terminal to function as: an acquisition unit configured to acquire acceleration detected by a sensor of the mobile terminal disposed in a vehicle while driving or a sensor provided in the vehicle as acceleration of the vehicle; a determination unit configured to determine a rank related to a risk level of driving by a driver of the vehicle on the basis of acceleration of the vehicle; and a display control unit configured to cause a display to show a display according to the determined rank.

Still another aspect of the present disclosure provides a control method of a mobile terminal used for safe driving support related to driving of a vehicle and associated with an individual driver, the method comprising: acquiring acceleration detected by a sensor of the mobile terminal disposed in a vehicle while driving or a sensor provided in the vehicle as acceleration of the vehicle; determining a rank related to a risk level of driving by a driver of the vehicle on the basis of acceleration of the vehicle; and causing a display to show a display according to the determined rank.

Yet another aspect of the present disclosure provides a system used for safe driving support related to driving of a vehicle, the system comprising a mobile terminal and a server, wherein: the mobile terminal is associated with an individual driver; the server comprises: one or more processors; and a memory storing instructions which, when the instructions are executed by the one or more processors, cause the server to function as: an acquisition unit configured to acquire, from the mobile terminal, acceleration detected by a sensor of the mobile terminal disposed in a vehicle while driving or a sensor provided in the vehicle as acceleration of the vehicle, a determination unit configured to determine a rank related to a risk level of driving by a driver of the vehicle on the basis of acceleration of the vehicle, and a transmission unit configured to transmit information for display according to the determined rank to the mobile terminal; and the mobile terminal causes a display to display the information for display received from the server.

According to the present invention, it is possible to implement a technique that enables easy evaluation of driving of a vehicle by a driver.

DESCRIPTION OF THE EMBODIMENTS

Figure 1:
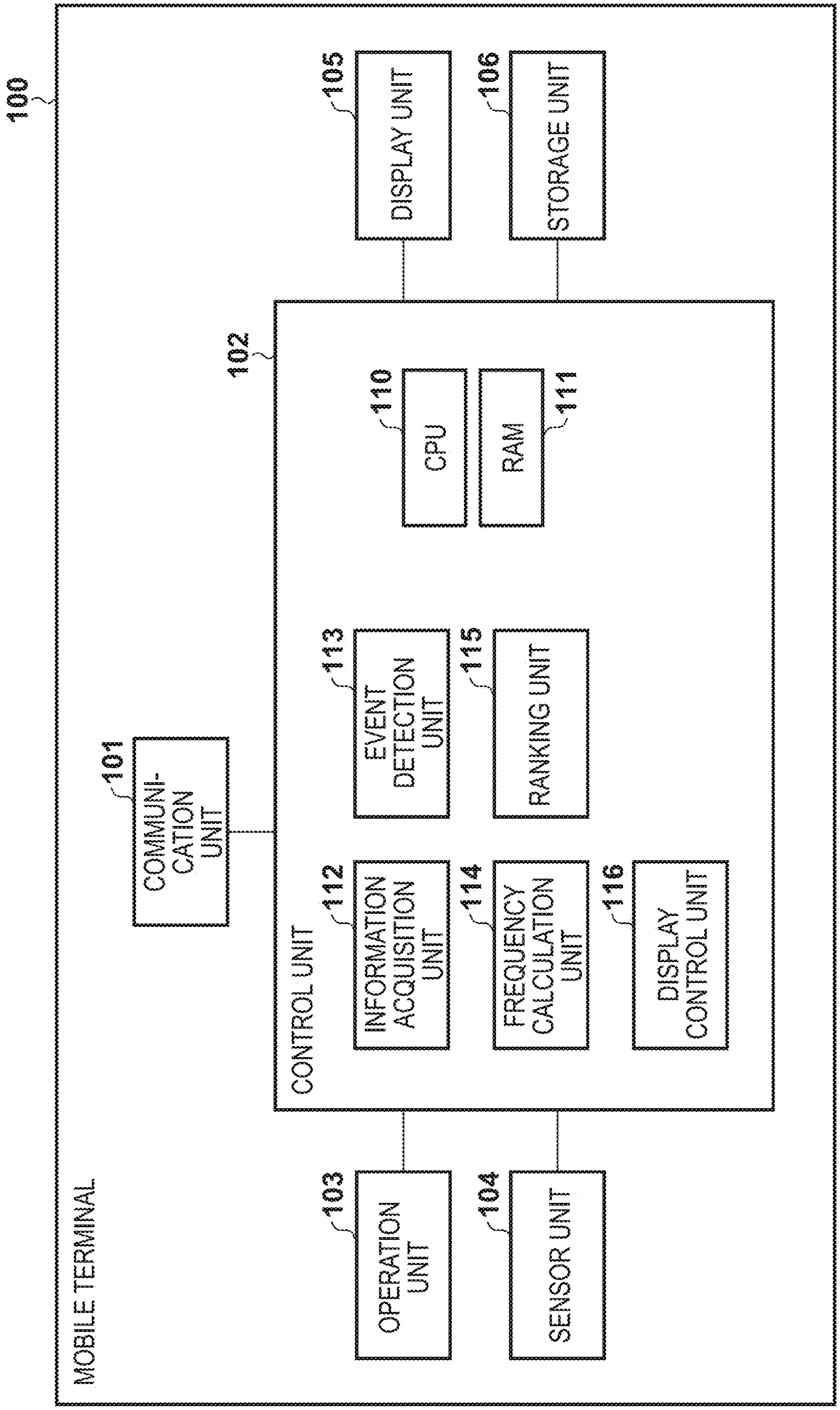
FIG. 1 is a block diagram illustrating a functional configuration example of a mobile terminal according to the present embodiment of the present invention.

Hereinafter, embodiments will be described in detail with reference to the attached drawings. Note, the following embodiments are not intended to limit the scope of the claimed invention, and limitation is not made to an invention that requires a combination of all features described in the embodiments. Two or more of the multiple features described in the embodiments may be combined as appropriate. Furthermore, the same reference numerals are given to the same or similar configurations, and redundant description thereof is omitted.

<Configuration of Mobile Terminal>

Next, a configuration example of a mobile terminal 100 will be described with reference to FIG. 1. The configuration example illustrated in FIG. 1 illustrates a configuration example of a smartphone as an example of the mobile terminal 100 of the present embodiment. Note that the functional blocks to be described may be integrated or separated from each other, and a function to be described may be implemented by another block. In addition, a functional block described as hardware may be implemented by software, and vice versa.

In the mobile terminal 100 according to the present embodiment, for example, an application (also referred to as safe driving support application) provided for safe driving support is installed. The mobile terminal 100 is associated with an individual driver in advance by an operation such as the driver logging in to the mobile terminal 100. Therefore, the safe driving support application can identify an individual driver. Note that the safe driving support application may accept the login of a driver and associate the mobile terminal 100 with the individual driver. In the present embodiment, since the driving of the driver is evaluated using the mobile terminal 100 associated in advance with the driver, the driver does not need to perform an operation or an action for identification such as logging into a navigation system or the like in the vehicle each time the driver gets in the vehicle. The mobile terminal 100 is disposed at a position in the vehicle where the driver can visually recognize the screen. When the mobile terminal 100 is disposed in the vehicle while driving in a state where the safe driving support application is operated, the safe driving support application provides the driver with various types of information for safe driving support.

A communication unit 101 is, for example, a communication device including a communication circuit and the like, and transmits and receives data to and from an external server or another mobile terminal via mobile communication such as LTE. The communication unit 101 may acquire various types of data indicating the state of the vehicle, such as acceleration, speed, steering angle, and position information, measured by the vehicle from the vehicle via a predetermined interface. Furthermore, the communication unit 101 may transmit information generated for display by the mobile terminal 100 described later for display on the vehicle side. In this case, the communication unit 101 may acquire, from the vehicle, operation information for the information displayed on the vehicle. The predetermined interface includes, for example, a short-range wireless communication interface such as Wi-Fi or Bluetooth (registered trademark) and a wired communication interface such as USB. Of course, the present invention is not limited to these examples, and the communication unit 101 can transmit or receive various types of information necessary for driving evaluation processing to be described later to and from the vehicle.

An operation unit 103 includes buttons and a touch panel included in the mobile terminal 100. The touch panel can receive operations on GUIs for various operations displayed on the display unit 105. A sensor unit 104 includes an acceleration sensor and a gyro sensor that measure acceleration and rotation of the mobile terminal 100 in addition to a GPS for identifying the current position.

A display unit 105 includes a display panel such as an LCD or an organic EL panel, and displays display information on the display panel in accordance with an instruction from a display control unit 116 described later.

Figure 2:
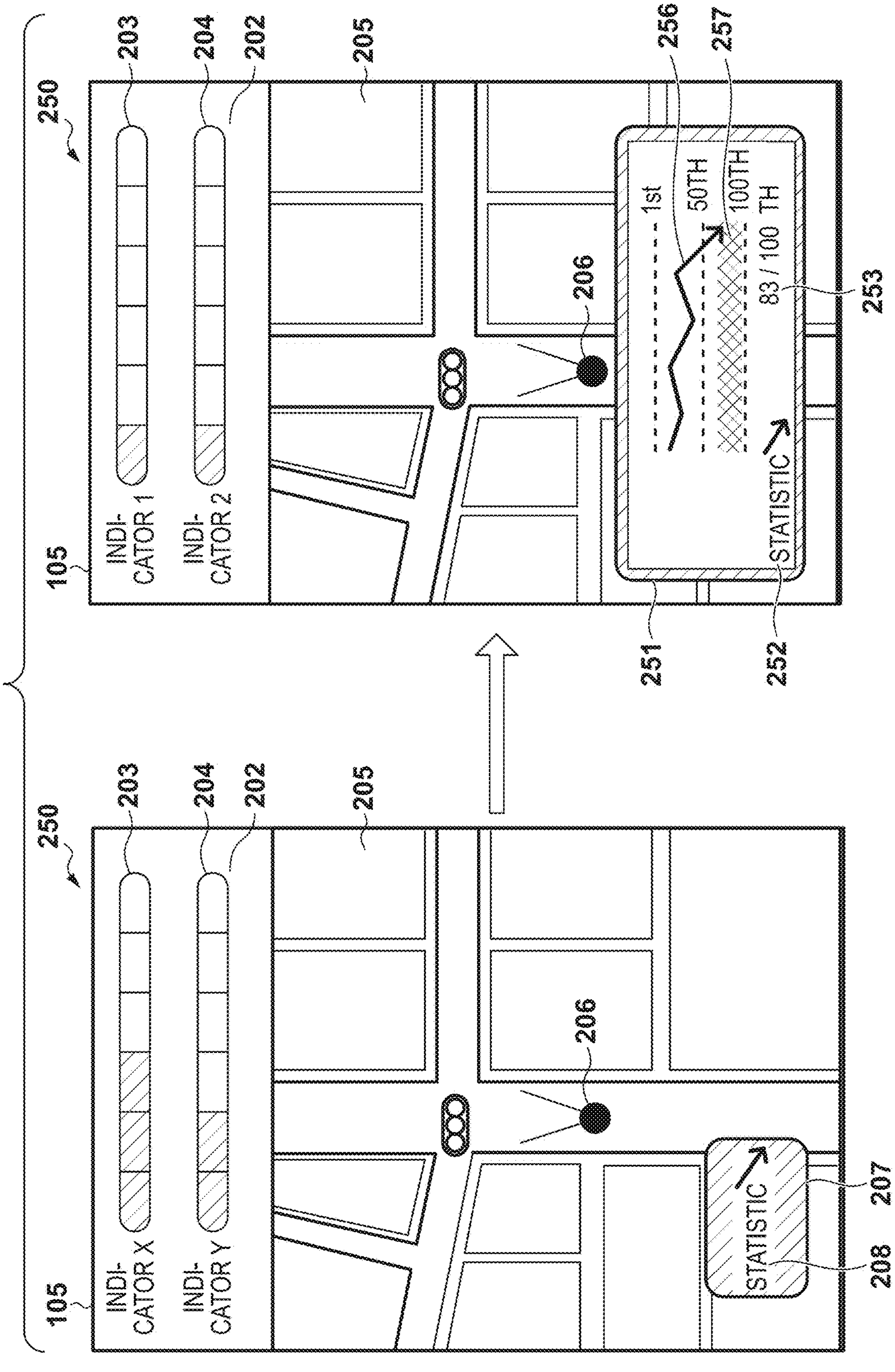
FIG. 2 is a diagram illustrating a display example of driving evaluation using the mobile terminal according to the present embodiment.

An example of a graphical user interface (GUI) for safe driving support displayed on the display unit 105 by the mobile terminal 100 in the vehicle while driving will be described with reference to FIG. 2. Note that in the following description, a case where the mobile terminal 100 displays a GUI for safe driving support on the display unit 105 will be described as an example. However, the display control by the mobile terminal 100 is not limited to this example. For example, the mobile terminal 100 may generate data for displaying a GUI for safe driving support and then transmit the generated data for displaying to the vehicle via the above-described interface. In this case, the vehicle may acquire the data for displaying and cause a display provided in the vehicle to display the GUI.

A GUI 201 is an example of a GUI for safe driving support displayed on the display unit 105 while the vehicle is traveling. The GUI 201 includes, for example, an indicator region 202, a map region 205, and a driving evaluation region 207.

The indicator region 202 can display various indicators related to driving. For example, an indicator 203 may indicate the magnitude of acceleration in the traveling direction of the vehicle. Furthermore, an indicator 204 can indicate, for example, the magnitude of acceleration (also referred to as lateral G or the like) in the lateral direction (direction orthogonal to traveling direction) of the vehicle. The indicators are not limited to these examples, and more or less indicators may be displayed. Since the mobile terminal 100 is disposed in the vehicle, acceleration detected by a sensor included in the mobile terminal 100 can be used as the acceleration of the vehicle. Therefore, the mobile terminal 100 can display various indications without acquiring the state of the vehicle from the vehicle by communication. Of course, as described above, various types of data (e.g. acceleration, speed, and steering angle) indicating the state of the vehicle may be acquired by communicating with the vehicle and displayed as indicators.

The map region 205 can display a map used for navigation. A self-vehicle position 206 indicates a position and a traveling direction of the vehicle. As will be described later, the mobile terminal 100 can display its own position detected by a sensor included in the mobile terminal 100 on the map region 205 as the position of the vehicle. Of course, communication with the vehicle may be performed to acquire the position of the vehicle and display the position as the self-vehicle position.

The driving evaluation region 207 displays a relative variation 208 of a rank (also simply referred to as rank of driver) related to the risk level of driving by the driver of the vehicle. The rank related to the risk level will be described later. The driving evaluation region 207 is displayed while the vehicle is traveling. Therefore, the driving evaluation region 207 includes less information than a driving evaluation region 251 displayed when the vehicle stops. For example, the driving evaluation region 207 does not include detailed information regarding the driver's rank. The driving evaluation region 207 includes an arrow representing a relative variation of the driver's rank. When the driver's rank is lower than a predetermined rank (e.g., 80th out of 100 ranks), the background region of the driving evaluation region 207 is displayed in a color (e.g., warm color such as red or orange) indicating that the risk is high. When the driver's rank is equal to or higher than a predetermined rank, the background region of the driving evaluation region 207 is displayed in a different mode (e.g., different color or different pattern) from the case where the driver's rank is lower than the predetermined rank. When the driver's rank is equal to or higher than a predetermined rank, the background region of the driving evaluation region 207 is displayed in a color (e.g., color such as gray or blue) indicating that the risk is not high.

A GUI 250 is an example of a GUI for safe driving support displayed when the vehicle is stopped. The GUI 250 is displayed on the display unit 105, and includes, for example, the indicator region 202, the map region 205, and the driving evaluation region 251. The indicator region 202 and the map region 205 in the GUI 250 display the same display contents as in the GUI 201. Therefore, the same reference numerals are given, and the description thereof will be omitted.

The driving evaluation region 251 may be displayed, for example, when the driver touches the driving evaluation region 207 or touches a predetermined button while the vehicle is stopped. When the vehicle is not stopped, the mobile terminal 100 does not display the driving evaluation region 251 even if the driver touches the driving evaluation region 207 or touches a predetermined button.

Figure 7:
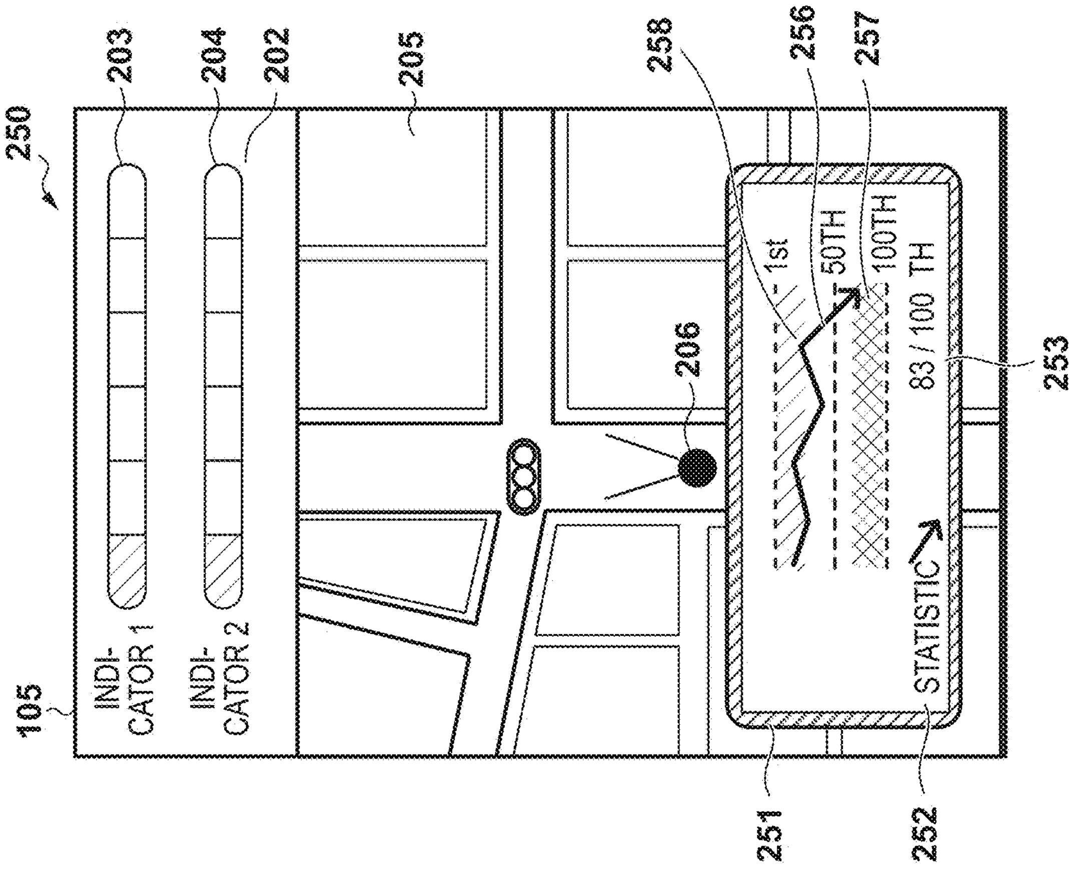
FIG. 7 is a diagram for describing another display example of driving evaluation using the mobile terminal according to the present embodiment.

The driving evaluation region 251 includes a relative rank variation 252, a driver's rank 253, a graph 256, and a danger zone 257. Similar to 208 described above, the relative rank variation 252 includes an arrow representing the relative variation of the driver's rank. When the driver's rank is lower than a predetermined rank, the background region of the driving evaluation region 251 is displayed in a color (e.g., warm color such as red or orange) indicating that the risk is high. When the driver's rank is equal to or higher than a predetermined rank, the background region of the driving evaluation region 251 is displayed in a different mode (e.g., different color or different pattern) from the case where the driver's rank is lower than the predetermined rank. When the driver's rank is equal to or higher than a predetermined rank, the background region of the driving evaluation region 251 is displayed in a color (e.g., color such as gray or blue) indicating that the risk is not high. The danger zone 257 indicates a zone ranked lower than a predetermined rank. The background region of the driving evaluation region 251 may be switched between a first mode (mode indicating a good state) in a case where the driver's rank is equal to or higher than a first threshold, a second mode (mode indicating a normal state) in which the driver's rank is lower than the first threshold and equal to or higher than a second threshold, and a third mode (mode indicating a bad state) in which the driver's rank is lower than the second threshold, according to the driver's rank. FIG. 7 illustrates another example of the driving evaluation region 251 illustrated in FIG. 2. In FIG. 7, an excellent zone 258 is further displayed in addition to the example illustrated in FIG. 2. The excellent zone 258 indicates a zone in which the driver's rank is from the first to a predetermined rank (e.g., 20th). The excellent zone 258 is displayed in a display mode (e.g., different color or different pattern) different from the danger zone 257. When the danger zone 257 is displayed in a color indicating high risk (e.g., warm color such as red or orange), the excellent zone 258 may be displayed in a color indicating high quality (e.g., blue).

The graph 256 indicates a transition of the driver's rank in a predetermined period. By checking the graph 256, the driver can grasp that his or her own rank is close to escaping the danger zone 257, that his or her own rank has escaped the danger zone 257, that his or her own rank is rising, and the like.

In the above example, the mobile terminal 100 displays the driving evaluation region 207 and then displays the driving evaluation region 251. However, the display order of these driving evaluation regions is not limited to this example. For example, it is possible to prevent both the driving evaluation region 207 and the driving evaluation region 251 from being displayed until the vehicle travels a predetermined distance (after safe driving support application is used). The driving evaluation region 251 may be displayed only once in response to the vehicle stopping after the vehicle travels a predetermined distance. In this way, it is possible to cause the driver to recognize that the driving evaluation app is operating. Next, the mobile terminal 100 may display the driving evaluation region 207 in response to the start of traveling of the vehicle, for example. Thereafter, as described above, the driving evaluation region 251 may be displayed according to the operation of the driver when the vehicle is stopped.

Figure 3:
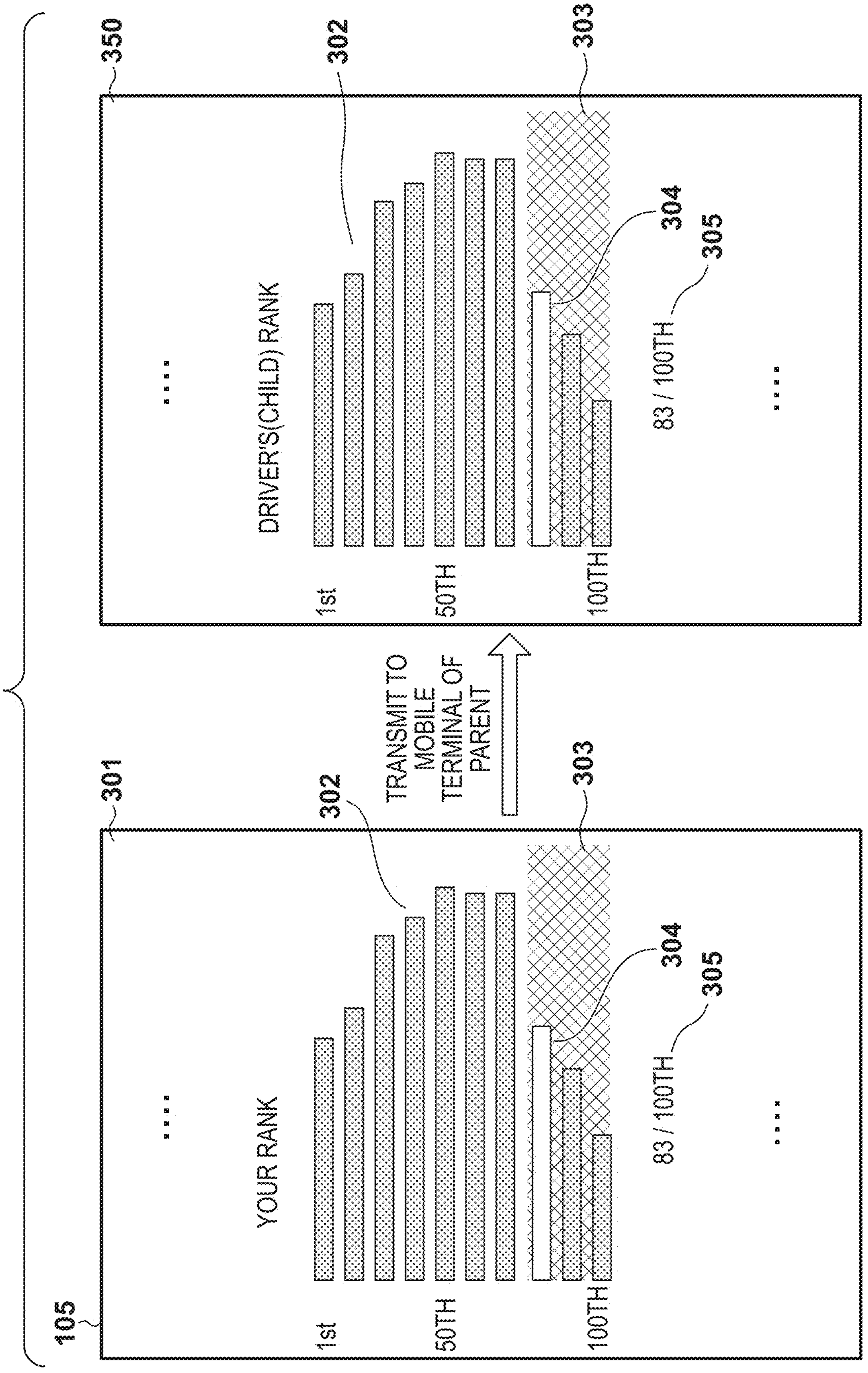
FIG. 3 is a diagram for describing another display example of a driving evaluation result according to the present embodiment.
Figure 8:
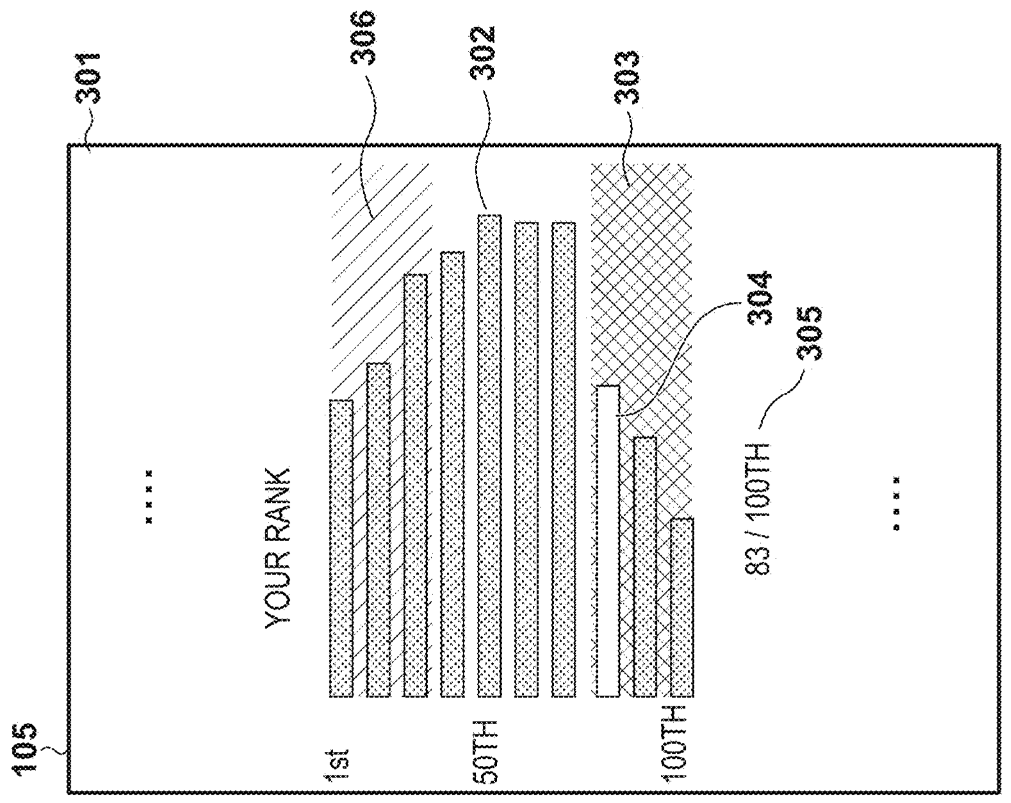
FIG. 8 is a diagram for describing another display example of the driving evaluation result according to the present embodiment.

FIG. 3 illustrates an example of another display screen 301 that displays the rank related to the driver's risk level (driver's rank). In the example illustrated in FIG. 3, the driver is in his or her teens or twenties. The display screen 301 includes a distribution 302 of a plurality of drivers, a rank 304 to which the driver belongs, a danger zone 303, and a driver's rank 305. The danger zone 303 indicates a zone ranked lower than a predetermined rank. The distribution 302 of the plurality of drivers represents the number of drivers of the same rank on the basis of the evaluation results of the driving of the plurality of drivers. The rank 304 to which the driver belongs is displayed in a color different from other ranks. FIG. 8 illustrates another example of the display screen 301 illustrated in FIG. 3. In FIG. 8, an excellent zone 306 is further displayed in addition to the example illustrated in FIG. 3. The excellent zone 306 indicates a zone in which the driver's rank is from the first to a predetermined rank (e.g., 20th). The excellent zone 306 is displayed in a display mode (e.g., different color or different pattern) different from the danger zone 303. When the danger zone 303 is displayed in a color indicating high risk (e.g., warm color such as red or orange), the excellent zone 306 may be displayed in a color indicating high quality (e.g., blue).

A display screen 350 illustrated in FIG. 3 is, for example, a display screen displayed on a screen of a mobile terminal of the driver's parent. The driver's parent may want to know whether or not his or her child's driving is safe, or may want enough information to trust the child's driving. The mobile terminal 100 transmits information for displaying the display screen 301 to the mobile terminal of the driver's parent, and the mobile terminal of the parent displays the display screen 350. As a result, the driver's parent can grasp the driving situation of the child by checking the display screen 350. The display screen 350 displays information similar to reference numerals 302 to 305 in the display screen 301.

Referring back to FIG. 1, the configuration of the mobile terminal 100 will be described.

A storage unit 106 includes, for example, a non-volatile memory such as a semiconductor memory, and stores a computer program (including application and OS) executed by a control unit 102.

The control unit 102 includes a CPU 110 and a RAM 111, and controls the operation of each functional block in the control unit 102 and each unit in the mobile terminal 100 by the CPU 110 executing a program stored in the storage unit 106, for example.

An information acquisition unit 112 acquires the position of the mobile terminal 100, the moving speed of the mobile terminal 100, the acceleration of the mobile terminal 100, and the like from the sensor unit 104. When the mobile terminal 100 is disposed in the vehicle while driving, the information acquisition unit 112 can acquire the acceleration in each direction detected by the sensor unit 104 as the acceleration in each direction of the vehicle. In addition, the information acquisition unit 112 can acquire the moving speed detected by the sensor unit 104 as the moving speed of the vehicle. Furthermore, the information acquisition unit 112 can acquire the position detected by the sensor unit 104 as the position of the vehicle.

An event detection unit 113 detects the occurrence of sudden acceleration, sudden deceleration, and sudden turning while driving on the basis of the acceleration of the vehicle. The event detection unit 113 detects, for example, sudden acceleration and sudden deceleration in which 0.5G or more occurs, sudden turning in which 0.5G or more occurs in the lateral direction, and sudden acceleration and sudden deceleration smaller than those described above. Note that while this example illustrates a case where it is determined whether sudden acceleration, sudden deceleration, or sudden turning of 0.5G or more has occurred, the threshold may be different for each event content. For example, the threshold of sudden acceleration may be 0.35G, and the threshold of sudden deceleration and sudden turning may be 0.5G. Regardless of which threshold is set, it is sufficient that occurrence of sudden acceleration, sudden deceleration, or sudden turning that rarely occurs and sudden acceleration or sudden deceleration smaller than these values can be detected. In the following description, these sudden acceleration, sudden deceleration, or sudden turning are also collectively referred to as an event.

Note that, for example, 0.3G is 0.3×9.81×3600/1000=10.6 [km/h/s], which corresponds to deceleration by 10.6 km/h in one second. The deceleration corresponding to 0.3G is relatively likely to occur on a daily basis. On the other hand, for example, 0.5G corresponds to deceleration by 0.5×9.81×3600/1000=17.7 [km/h/s]. From 17.7×3=53 [km/h], 0.5G corresponds to such a sudden deceleration that a vehicle traveling at 53 [km] per hour stops in three seconds, and does not occur frequently in normal driving.

When an event that generates 0.5G or more is detected and the driver is evaluated, since the majority of drivers do not generate the event, a system in which there is no change for the majority of drivers (there is no difference in ranks of most drivers) is obtained. Therefore, in the present embodiment, by taking into account sudden acceleration and sudden deceleration that generate 0.3G or more and less than 0.5G and sudden acceleration, sudden deceleration, and sudden turning that generate 0.5G or more, appropriate ranking is performed even for drivers that do not generate 0.5G or more.

A frequency calculation unit 114 calculates each frequency from the number of occurrences of each event. The frequency calculation unit 114 calculates the occurrence frequency from the number of occurrences of each event within 200 km of the vehicle. For example, when the vehicle travels 201 km, the frequency calculation unit 114 calculates the occurrence frequency of the event from the number of times of occurrence of the event between 1 km and 201 km/200 [km]×100. Note that between the start of traveling and the predetermined distance, the number of occurrences of the event may be divided by the accumulated travel distance [km] to be multiplied by 100. In this manner, the frequency calculation unit 114 can evaluate driving by the driver of the vehicle on the basis of the acceleration of the vehicle.

In addition, the frequency calculation unit 114 executes relief processing to be described later. In the relief processing, for example, when the driver generates an event of 0.5G or more, the rank becomes lower than the lower 20% due to the one event. Hence, if the driver continues driving without generating 0.5G thereafter, the rank is restored. Details of the relief processing will be described later.

A ranking unit 115 ranks the risk level of a driver on the basis of the occurrence frequencies of an event that generates 0.3G or more and less than 0.5G and two events that generate 0.5G or more. The ranking unit 115 determines the rank related to the driver's risk level on the basis of a comparison between the evaluation results of the driving by the driver (occurrence frequencies of three events) and the evaluation results of the driving of the plurality of drivers based on travel histories of the plurality of drivers in the past (occurrence frequencies of three events).

The ranking unit 115 calculates a rank related to the driver's risk level for each predetermined travel distance (e.g., 1 km) of the vehicle. In addition, the ranking unit 115 calculates the rank related to the driver's risk level at the timing when the vehicle stops. In this way, for example, when the driver suddenly brakes and the vehicle stops, it is possible to display the latest rank reflecting the result of braking immediately before stopping.

The display control unit 116 causes the display unit 105, for example, to display a display according to the rank determined by the ranking unit 115. The display control unit 116 controls display of the driving evaluation region 207 and the driving evaluation region 251, for example. The display control of these driving evaluation regions will be described later.

<Series of Operations of Driving Evaluation Processing>

Figure 4:
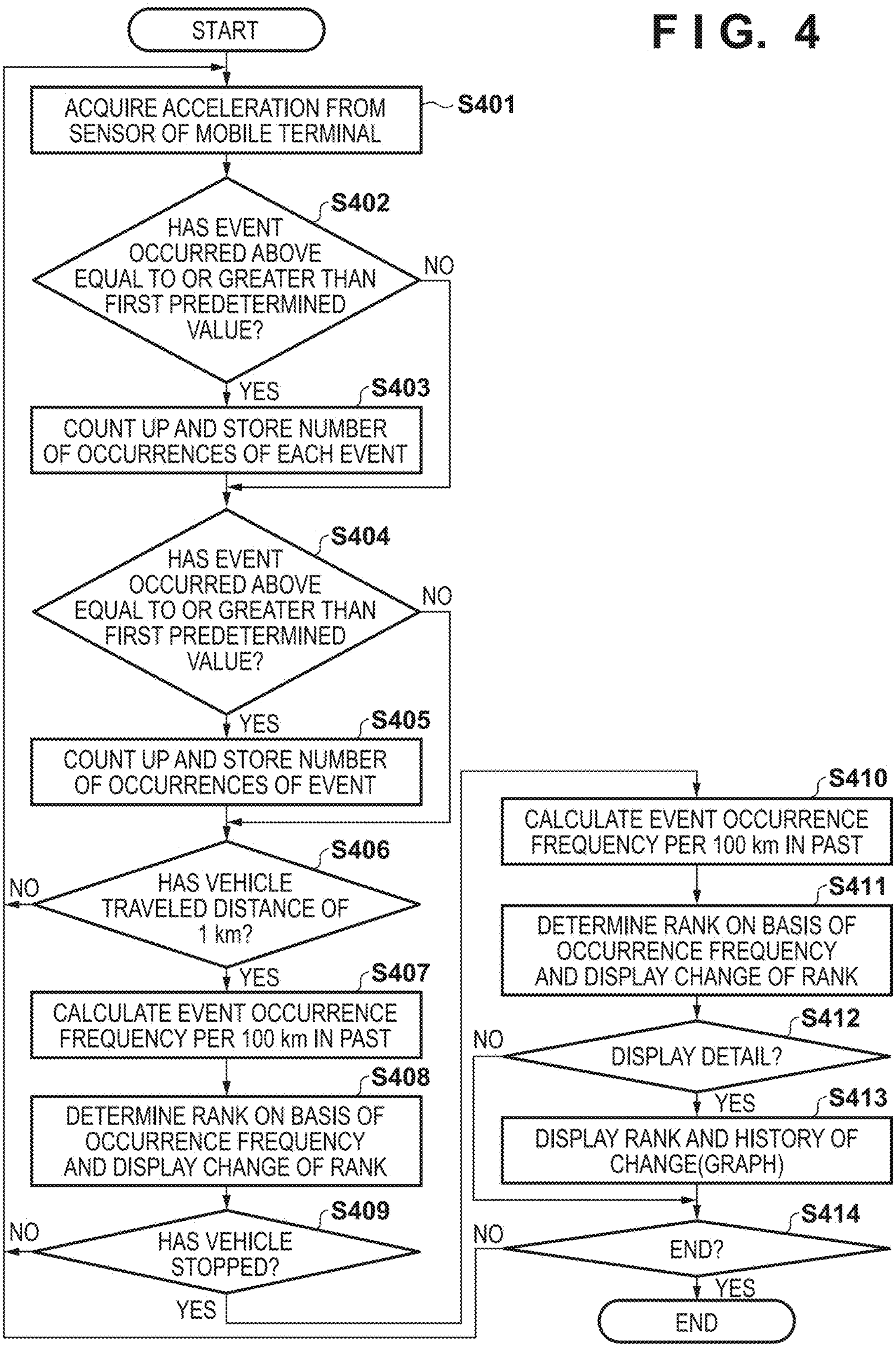
FIG. 4 is a flowchart illustrating a series of operations of driving evaluation processing according to the present embodiment.

Next, a series of operations of driving evaluation processing according to the present embodiment will be described with reference to FIG. 4. Note that the series of operations of the driving evaluation processing is implemented by the CPU 110 of the control unit 102 developing a computer program stored in the storage unit 106 in the RAM 111 and executing the computer program. Furthermore, the series of operations of the driving evaluation processing is executed when the safe driving support application is executed in the mobile terminal 100 and the vehicle in which the mobile terminal 100 is disposed travels. As described above, the mobile terminal 100 is associated with an individual driver in advance by an operation such as the driver logging into the mobile terminal 100. Therefore, the processing described below is performed for an individual driver.

In S401, the information acquisition unit 112 acquires the acceleration detected by the sensor unit 104 of the mobile terminal 100 as the acceleration of the vehicle. In S402, the event detection unit 113 determines whether an event in which the acceleration is equal to or greater than a first predetermined value has occurred. The first predetermined value is, for example, 0.5G, and the event in which the acceleration is equal to or greater than the first predetermined value is, for example, sudden acceleration, sudden deceleration, or sudden turning in which an acceleration of 0.5G occurs. That is, the event detection unit 113 determines whether sudden acceleration, sudden deceleration, or sudden turning that rarely occurs has occurred. When the event detection unit 113 determines that an event in which the magnitude of the acceleration is 0.5G has occurred, the processing proceeds to S403. Otherwise, the processing of S403 is omitted and the processing proceeds to S404. In S403, the frequency calculation unit 114 counts up the number of occurrences of each event (sudden acceleration, sudden deceleration, or sudden turning) in which acceleration of a magnitude of 0.5G occurs and stores the number in the storage unit 106. Note that while the processing of this example illustrates a case where it is determined whether sudden acceleration, sudden deceleration, or sudden turning of 0.5G or more has occurred, as described above, the threshold may be different for each event content. For example, the threshold of sudden acceleration may be 0.35G, and the threshold of sudden deceleration and sudden turning may be 0.5G. Regardless of which threshold is set, it is sufficient that occurrence of sudden acceleration, sudden deceleration, or sudden turning that rarely occurs can be determined in S402. The same applies to the following description.

In S404, the event detection unit 113 determines whether an event in which the acceleration is equal to or greater than a second predetermined value has occurred. The second predetermined value is, for example, 0.3G, and the event in which the acceleration is equal to or greater than the second predetermined value is, for example, sudden acceleration or sudden deceleration in which an acceleration of 0.3G occurs. That is, the event detection unit 113 determines whether sudden acceleration or sudden deceleration, which is relatively likely to occur even in general driving of the driver, has occurred. The reason for evaluating the occurrence of such sudden acceleration and deceleration is to make it easier to determine the level of safety among drivers who do not generate the acceleration of 0.5G. When the event detection unit 113 determines that an event in which the magnitude of the acceleration is 0.3G has occurred, the processing proceeds to S405. Otherwise, the processing of S405 is omitted and the processing proceeds to S406. Note that while the example of S404 illustrates a case of sudden acceleration and sudden deceleration in which the acceleration of 0.3G or more is generated, it is also possible to use only the sudden deceleration. In S405, the frequency calculation unit 114 counts up the number of occurrences of an event (sudden acceleration or sudden deceleration) in which acceleration of a magnitude of 0.3G occurs and stores the number in the storage unit 106.

In S406, the frequency calculation unit 114 determines whether the vehicle has traveled a distance of 1 km. The frequency calculation unit 114 makes this determination to calculate the occurrence frequency of the event every 1 km. When determining that the vehicle has traveled 1 km, the frequency calculation unit 114 calculates the occurrence frequency of the event in S407, and otherwise, returns the processing to S401. The event occurrence frequency in S407 is, for example, the event occurrence frequency per predetermined distance (e.g., per 100 km) in the past. The frequency calculation unit 114 calculates, for example, occurrence frequencies of events such as sudden acceleration and sudden deceleration in which acceleration with a magnitude of 0.5G occurs, sudden turning in which acceleration with a magnitude of 0.5G occurs, and sudden acceleration and sudden deceleration in which acceleration with a magnitude of 0.3G occurs. In this way, the driving by the driver can be evaluated by the occurrence frequency of a number of events.

In S408, the ranking unit 115 compares the occurrence frequency of each event with the occurrence frequency of the event of each driver on the basis of the travel histories of a plurality of drivers in the past, and determines the rank (driver's rank) related to the risk level of the driver of the vehicle. By determining such a rank, the mobile terminal 100 can provide the driver or a parent of the driver with a guide for checking whether the driving by the driver while driving is safe as compared with many other drivers. The ranking unit 115 can determine the driver's rank from ranks 1 to 100 according to the occurrence frequency of the event. At this time, it is assumed that the vehicle is traveling. In this case, the display control unit 116 causes the display unit 105 to display only the relative variation of the driver's rank (corresponding to relative variation 208 of driving evaluation region 207 described above).

In S409, the frequency calculation unit 114 determines whether the vehicle has stopped (e.g., based on speed acquired by information acquisition unit 112). By making this determination, the frequency calculation unit 114 can calculate the occurrence frequency of the event every time the vehicle stops. That is, when the vehicle stops due to sudden braking or the like by the driver, even in a case where the vehicle has not traveled to the 1 km break, it is possible to determine the latest rank in consideration of the influence of the sudden braking and provide the latest rank to the driver. In S410, the frequency calculation unit 114 calculates the event occurrence frequency similarly to S407. Then, in S411, the ranking unit 115 and the display control unit 116 determine the rank similarly to S408 and cause the display unit 105 to display the relative variation of the rank.

In S412, the control unit 102 determines whether an operation to display a detailed display (operation to display driving evaluation region 251) has been received from the driver. When it is determined that the operation has been received, the control unit 102 advances the processing to S413, and otherwise advances the processing to S414.

In S413, in order to display the driving evaluation region 251, the display control unit 116 causes the display unit 105 to display the driver's rank and the transition of the rank in a predetermined period.

In S414, the control unit 102 determines whether to end the processing. For example, when receiving an instruction to end the safe driving support application, the control unit 102 determines to end the processing and ends the series of operations, and otherwise returns the processing to S401.

<Series of Operations of Relief Processing>

Next, a series of operations of relief processing will be described with reference to FIG. 5. The relief processing is processing of restoring the rank once lowered on condition that safe driving is continued. In addition, by providing the driver with the state in which the rank is restored, it is possible to change his or her behavior for driving more safely. Note that the series of operations of the relief processing is implemented by the CPU 110 of the control unit 102 developing a computer program stored in the storage unit 106 in the RAM 111 and executing the computer program. Furthermore, the series of operations of the relief processing is executed when the safe driving support application is executed in the mobile terminal 100 and the vehicle in which the mobile terminal 100 is disposed travels. Note that in the following description of the relief processing, the number of times of occurrence of an event is counted every time the vehicle travels 1 km, similarly to the description of FIG. 4. In addition, the mobile terminal 100 is associated with an individual driver in advance, and processing described below is performed for an individual driver.

In S501, the event detection unit 113 determines whether an event (e.g., causing acceleration of 0.5G) has occurred while the vehicle travels up to a predetermined distance X km. The event detection unit 113 advances the processing to S402 if an event has occurred, and ends the relief processing if no event has occurred. In S502, the frequency calculation unit 114 stores the number of occurrences N of events up to the distance X and a count for subtraction. At this point, the count for subtraction is initialized to 1.

In S503, the event detection unit 113 determines whether an event occurs again within the next 1 km (within X+1 km). If an event occurs, the processing proceeds to S404, and if no event occurs, the processing proceeds to S405.

In S504, if the number of times of occurrence of the event within the distance of X km is N, the frequency calculation unit 114 calculates the number of times of occurrence of the event by N=N*(1−0.2*C). That is, the frequency calculation unit 114 restores the driver's rank every time the vehicle travels 1 km after the occurrence of the event if the driver has not generated an event such as sudden acceleration or sudden deceleration of 0.5G.

In S505, if the number of times of occurrence of the event within the distance up to X km is N, and the number of times of occurrence of the event within the previous 1 km is M, the frequency calculation unit 114 calculates the number of times of occurrence of the event by N=N*(1−0.2*C)+M.

In S506, the frequency calculation unit 114 adds the subtraction count by C=C+1. That is, the frequency calculation unit 114 adds the subtraction count every time the vehicle travels 1 km. When the subtraction count C reaches a value of 5 by adding the subtraction count, the number of occurrences N becomes 0 (N=N*(1−0.2*5)=N*0.0). That is, the driver's rank is improved (restored) as the subtraction count increases.

In S507, the frequency calculation unit 114 ends the processing if C exceeds 5, and repeats the processing from S503 if C does not exceed 5.

Figure 5:
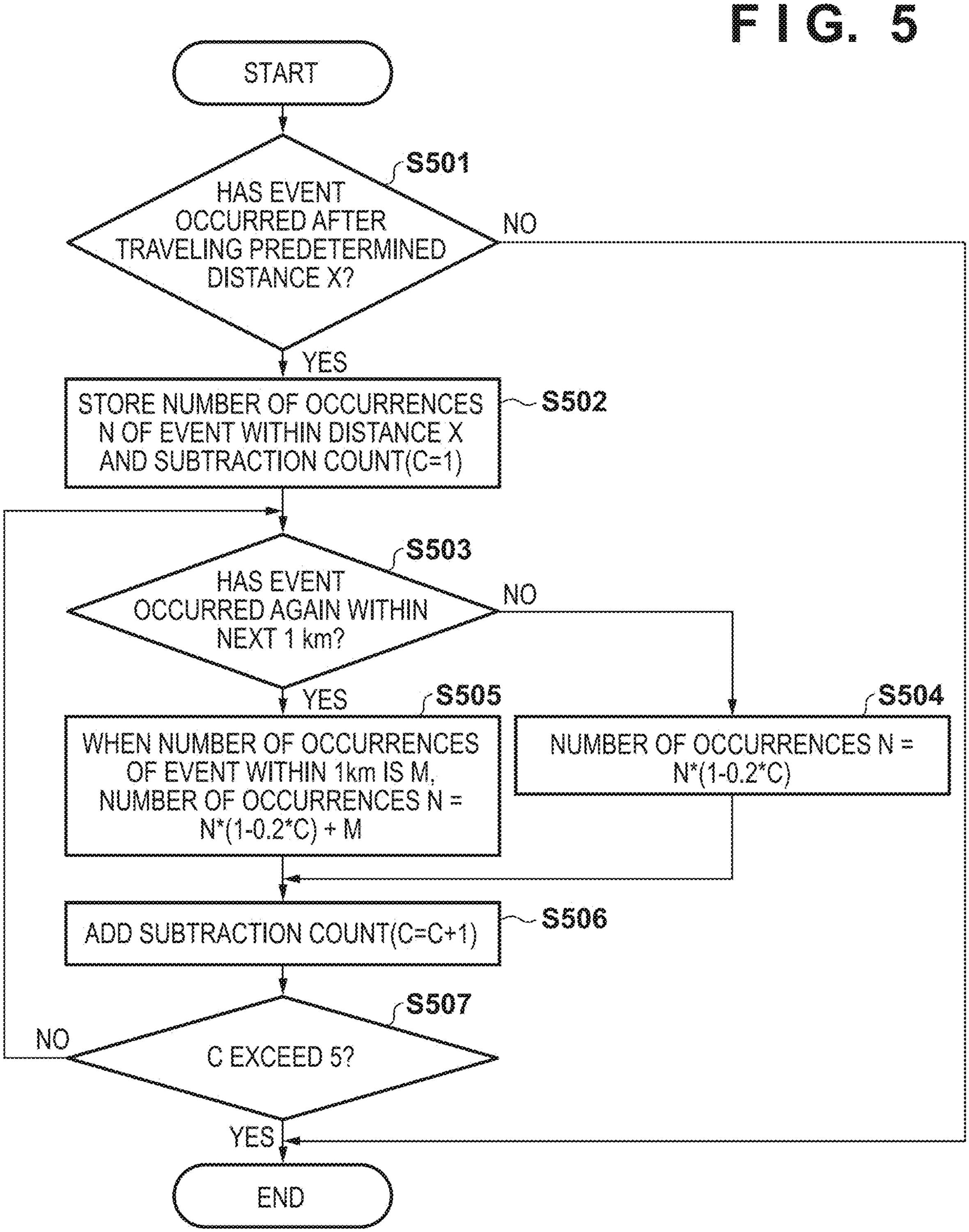
FIG. 5 is a flowchart illustrating a series of operations of relief processing according to the present embodiment.

Note that in the example illustrated in FIG. 5, the rank is restored when the vehicle safely travels 5 km. However, the rank may be restored when the vehicle travels a longer distance.

With such relief processing, when a highly safe driver happens to cause sudden acceleration, sudden deceleration, or sudden turning with an acceleration of 0.5G, the driver's rank can be restored to an appropriate rank. In addition, by providing the driver with a state in which the rank is improved, the behavior change of the driver can be promoted.

Figure 6:
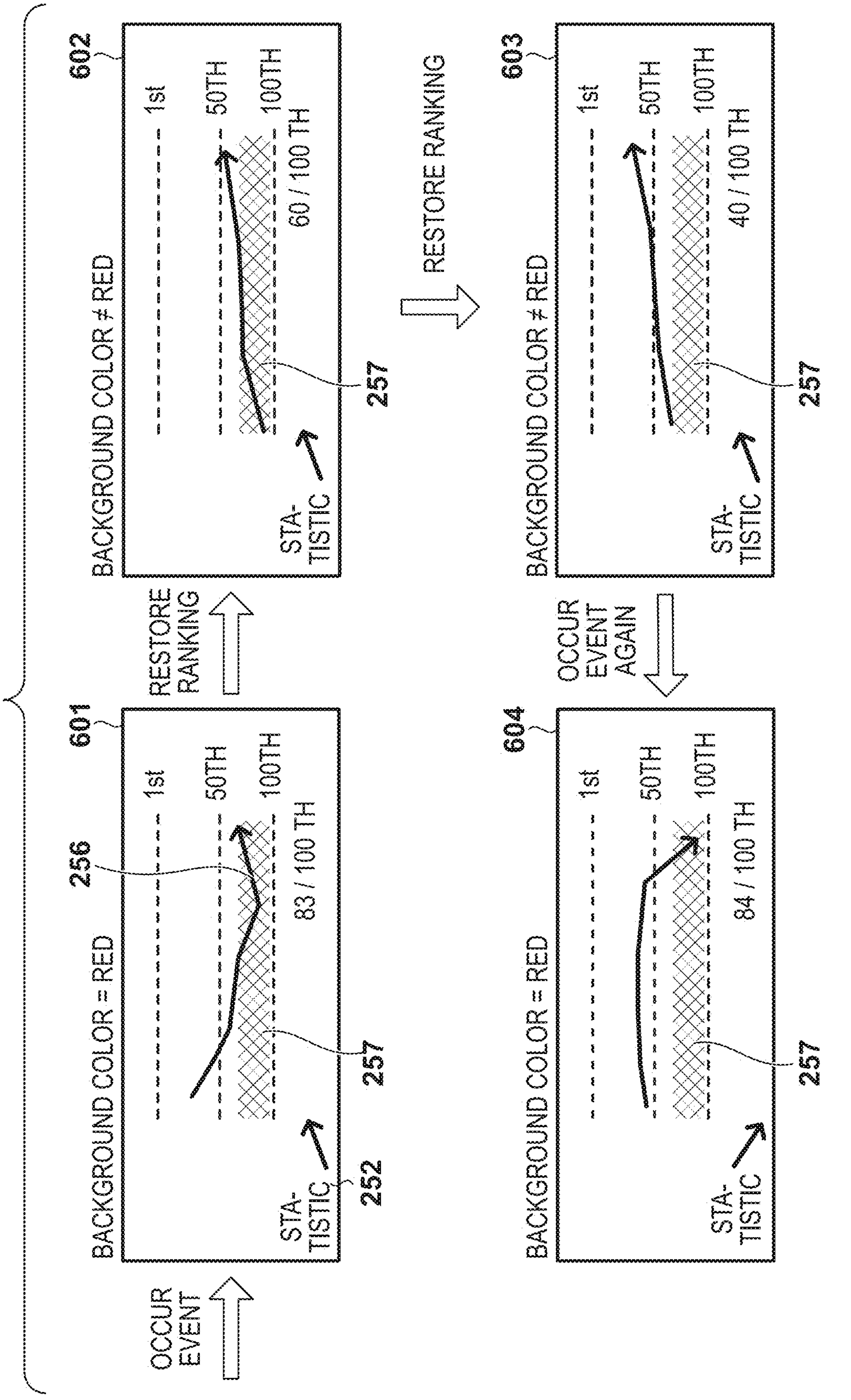
FIG. 6 is a diagram illustrating an effect of a display example of driving evaluation according to the present embodiment.

Next, an example of the driving evaluation region 251 using the relief processing will be described with reference to FIG. 6. A driving evaluation region 601 illustrated in FIG. 6 illustrates a display example immediately after the driver has caused an event such as sudden acceleration or sudden deceleration of 0.5G. The display control unit 116 displays the background region of the driving evaluation region 601 in a color indicating that the risk is high. A transition 256 of the driver's rank is displayed so as to increase, and is displayed so as to be positioned just at the upper limit of the danger zone 257. As a result, it is indicated that the driver is close to escaping the danger zone 257, and a behavior change is given such that the driver aims at driving without causing an event such as sudden acceleration or sudden deceleration of 0.5G.

A driving evaluation region 602 indicates that the driver's rank has escaped the danger zone 257 as a result of the continued safe driving. The display control unit 116 displays the background region of the driving evaluation region 602 in a color indicating that the risk is not high. The display of the transition of the driver's rank and the change of the background color can impress the driver that the driver has escaped the low evaluation rank.

A driving evaluation region 603 indicates a state in which the driver's rank smoothly improves. By indicating that the driver's rank smoothly improves and escapes the danger zone 257, an intention to maintain the current safe driving is prompted.

The driving evaluation region 604 illustrates a state in which the driver's rank is lowered to the danger zone 257 again when the driver causes an event such as sudden acceleration or sudden deceleration of 0.5G. The display control unit 116 switches the background region of the driving evaluation region 604 to a color indicating that the risk is high. As a result, when the driver causes an event such as sudden acceleration or sudden deceleration of 0.5G to occur again, it is possible to more intuitively grasp the deterioration of the situation and to prompt a change in behavior aiming at safe driving again.

Note that the frequency calculation unit 114 may limit the number of times of application of the relief processing described above. For example, when the driver performs sudden acceleration, sudden deceleration, or sudden turning of 0.5G for the first time, the frequency calculation unit 114 can perform the first relief processing in order to restore the driver's rank. At this time, the frequency calculation unit 114 adjusts the parameters of the relief processing so that the rank is restored by, for example, 10 ranks.

Next, when the driver performs the second sudden acceleration, sudden deceleration, or sudden turning of 0.5G, the frequency calculation unit 114 can perform the second relief processing to restore the driver's rank. In this case, the frequency calculation unit 114 adjusts the parameters of the relief processing so that the rank is restored by, for example, five ranks.

Furthermore, when the driver performs the third sudden acceleration, sudden deceleration, or sudden turning of 0.5G, the frequency calculation unit 114 can perform the third relief processing to restore the driver's rank. In this case, the frequency calculation unit 114 adjusts the parameters of the relief processing so that the rank is restored by, for example, two ranks. Thereafter, for example, when the driver performs the fourth sudden acceleration, sudden deceleration, or sudden turning of 0.5G, the frequency calculation unit 114 can be configured not to execute the subsequent relief processing. In a case where the relief processing is not performed, for example, the number of times of occurrence of an event is maintained while the vehicle travels a predetermined distance (e.g., 100 km or 200 km), and thus the driver's rank is not restored.

As described above, when the driver's rank is lowered due to the detection of an event in which acceleration (e.g., 0.5G or 0.35G) of a magnitude that rarely occurs has occurred, the frequency calculation unit 114 improves the rank for each travel distance of the vehicle. In this way, it is possible to prevent a lower rank from being given for a long period of time due to an event that has occurred once. Then, the possibility of stopping the use of the safe driving support application due to the set low rank can be reduced. In addition, when the frequency calculation unit 114 detects an event in which acceleration of a magnitude that rarely occurs has occurred more than a predetermined number of times, the frequency calculation unit 114 does not perform processing of improving the rank with respect to the decrease in the driver's rank. In this way, it is possible to fix a lower rank (rank of higher risk level) to a driver who repeats driving that lowers the rank. In addition, the frequency calculation unit 114 decreases the degree of improving the driver's rank as the number of times of detecting an event in which acceleration of a magnitude that rarely occurs has occurred increases. In this way, as the number of times of detection of the event increases, the degree of expectation for the relief processing by the driver can be reduced.

As described above, in the present embodiment, the program for safe driving support related to driving of the vehicle is executed in the mobile terminal associated in advance with the driver. According to the program, the mobile terminal acquires, as the acceleration of the vehicle, the acceleration detected by the sensor of the mobile terminal disposed in the vehicle while driving or the sensor provided in the vehicle, determines the driver's rank on the basis of the acceleration of the vehicle, and causes a display to show a display according to the determined rank. In this way, the driver does not need to perform an operation or an action for identification such as logging into a navigation system or the like in the vehicle each time the driver gets into the vehicle, and driving of the vehicle by the driver can be easily evaluated.

Note that in the above-described embodiment, the driving evaluation processing and the relief processing are executed in the mobile terminal. However, the present embodiment is not limited to the above example. For example, acceleration detected by a sensor of a mobile terminal disposed in a vehicle while driving or a sensor provided in the vehicle may be transmitted to a server via the mobile terminal, and the above-described driving evaluation processing and relief processing may be executed in the server. That is, the server may include the event detection unit 113, the frequency calculation unit 114, the ranking unit 115, and the display control unit 116 described above. Then, the server may transmit the generated information for display to the mobile terminal, and the mobile terminal may display the GUIs 201, 250, and the like on the display unit 105. The server may acquire information for identifying the driver or information for identifying the mobile terminal from the mobile terminal. Even in this case, the system including the mobile terminal and the server makes it possible to easily evaluate the driving of the vehicle by the driver.

Summary of Embodiment (Item 1)

A program executed on a mobile terminal, wherein:

the program is a program for safe driving support related to driving of a vehicle;

the mobile terminal is associated with an individual driver; and the mobile terminal comprises:

one or more processors; and a memory storing instructions which, when the instructions are executed by the one or more processors, cause the mobile terminal to function as:

an acquisition unit configured to acquire acceleration detected by a sensor of the mobile terminal disposed in a vehicle or a sensor provided in the vehicle as acceleration of the vehicle while driving, a determination unit configured to determine a rank related to a risk level of driving by a driver of the vehicle on the basis of acceleration of the vehicle, and a display control unit configured to cause a display to show a display according to the determined rank.

According to this embodiment, it is possible to easily evaluate the driving of a vehicle by a driver.

(Item 2)

The program according to item 1, wherein the instructions further cause the mobile terminal to function as comprising an evaluation unit configured to evaluate driving by a driver of the vehicle on the basis of acceleration of the vehicle, and wherein the determination unit determines a rank related to the risk level of the driver on the basis of a comparison between a driving evaluation result by the driver and driving evaluation results of a plurality of drivers based on past travel histories of the plurality of drivers.

According to this embodiment, it is possible to provide an indication for confirming whether driving by the driver while driving is safe as compared with many other drivers.

(Item 3)

The program according to item 1, wherein the acquisition unit further acquires a position detected by a sensor of the mobile terminal or a sensor provided in the vehicle as a position of the vehicle, and the determination unit recalculates the rank of the risk level of the driver for each predetermined travel distance.

According to this embodiment, the driver's rank can be updated as needed in accordance with the traveling of the vehicle.

(Item 4)

The program according to item 1, wherein when the vehicle is moving, the display control unit causes the display to display a relative variation of a rank related to the risk level of the driver.

According to this embodiment, by providing only the variation of the rank, the driver is allowed to concentrate on driving while maintaining motivation for safe driving.

(Item 5)

The program according to item 1, wherein when the vehicle is stopped, the display control unit causes the display to display a numerical value indicating a rank related to the risk level of the driver.

According to this embodiment, it is possible to provide information with which the driver can more accurately grasp the details and the current state at the timing when the driver can gaze at the display.

(Item 6)

The program according to item 5, wherein when the vehicle is stopped, the display control unit further causes the display to display a transition in a predetermined period of a rank related to the risk level of the driver.

According to this embodiment, it is possible to provide information that gives a detailed and stronger motivation for safe driving at a timing when the driver can gaze at the display.

(Item 7)

The program according to item 1, wherein the display control unit switches whether or not to display a transition in a predetermined period of a rank related to the risk level of the driver depending on whether the vehicle is moving or stopped.

According to this embodiment, it is possible to achieve a balance between a display for concentrating on driving and a display that provides stronger motivation for safe driving.

(Item 8)

The program according to item 1, wherein when the rank related to the risk level of the driver is lower than a predetermined rank, the display control unit causes the display to show a display according to the determined rank by using a display color different from a display color when the rank is equal to or higher than the predetermined rank.

According to this embodiment, it is possible to intuitively grasp that the driver's rank is bad and that the driver has escaped the bad state.

(Item 9)

The program according to item 1, wherein when the rank related to the risk level of the driver is equal to or higher than a predetermined rank, the display control unit causes the display to show a display according to the determined rank by using a display color different from a display color when the rank is lower than the predetermined rank.

According to this embodiment, it is possible to intuitively grasp that the driver's rank is good and that the driver has entered a good state.

(Item 10)

The program according to item 1, wherein the acquisition unit further acquires a moving speed detected by a sensor of the mobile terminal or a sensor provided in the vehicle as a vehicle speed of the vehicle, and the determination unit recalculates the rank related to the risk level of the driver each time the vehicle stops.

According to this embodiment, it is possible to provide the driver with the latest rank in consideration of the latest situation such as the influence of sudden braking at the time of stopping.

(Item 11)

The program according to item 2, wherein the evaluation unit evaluates driving by the driver by measuring at least an occurrence frequency of an event in which acceleration equal to or greater than a first predetermined value occurs and an occurrence frequency of an event in which acceleration equal to or greater than a second predetermined value smaller than the first predetermined value occurs.

According to this embodiment, while evaluating driving on the basis of events that occur infrequently but are highly serious, it is possible to appropriately differentiate drivers who do not cause highly serious events on the basis of events that occur frequently but are less serious.

(Item 12)

The program according to item 2, in which in a case where a rank related to the risk level of the driver is lowered by detection of an event in which acceleration equal to or greater than a first predetermined value occurs, the evaluation unit increases the rank for each travel distance of the vehicle.

According to this embodiment, it is possible to prevent a lower rank from being given for a long time due to an event that has occurred once.

(Item 13)

The program according to item 11, in which when detecting an event in which acceleration equal to or greater than the first predetermined value occurs more than a predetermined number of times, the evaluation unit does not perform processing of improving the rank related to the risk level of the driver with respect to a decrease in the rank.

According to this embodiment, it is possible to fix a lower rank (rank of higher risk level) to a driver who repeats driving that lowers the rank.

(Item 14)

The program according to item 12, in which the evaluation unit decreases the degree of improvement of the driver's rank as the number of times of detection of the event in which the acceleration equal to or greater than the first predetermined value occurs increases.

According to this embodiment, as the number of times of detection of the event increases, the degree of expectation for the relief processing by the driver can be reduced.

(Item 15)

A mobile terminal used for safe driving support related to driving of a vehicle and associated with an individual driver, the mobile terminal comprising:

one or more processors; and a memory storing instructions which, when the instructions are executed by the one or more processors, cause the mobile terminal to function as:

an acquisition unit configured to acquire acceleration detected by a sensor of the mobile terminal disposed in a vehicle while driving or a sensor provided in the vehicle as acceleration of the vehicle;

a determination unit configured to determine a rank related to a risk level of driving by a driver of the vehicle on the basis of acceleration of the vehicle; and a display control unit configured to cause a display to show a display according to the determined rank.

According to this embodiment, a mobile terminal capable of easily evaluating driving of a vehicle by a driver is provided.

(Item 16)

A control method of a mobile terminal used for safe driving support related to driving of a vehicle and associated with an individual driver, the method comprising:

acquiring acceleration detected by a sensor of the mobile terminal disposed in a vehicle while driving or a sensor provided in the vehicle as acceleration of the vehicle;

determining a rank related to a risk level of driving by a driver of the vehicle on the basis of acceleration of the vehicle; and causing a display to show a display according to the determined rank.

According to this embodiment, a control method capable of easily evaluating driving of a vehicle by a driver is provided.

(Item 17)

A storage medium storing the program according to any one of items 1 to 13.

According to this embodiment, a storage medium capable of easily evaluating driving of a vehicle by a driver is provided.

(Item 18)

A system used for safe driving support related to driving of a vehicle, the system comprising a mobile terminal and a server, wherein:

the mobile terminal is associated with an individual driver;

the server comprises:

one or more processors; and a memory storing instructions which, when the instructions are executed by the one or more processors, cause the server to function as:

an acquisition unit configured to acquire, from the mobile terminal, acceleration detected by a sensor of the mobile terminal disposed in a vehicle while driving or a sensor provided in the vehicle as acceleration of the vehicle, a determination unit configured to determine a rank related to a risk level of driving by a driver of the vehicle on the basis of acceleration of the vehicle, and a transmission unit configured to transmit information for display according to the determined rank to the mobile terminal; and the mobile terminal causes a display to display the information for display received from the server.

According to this embodiment, a system capable of easily evaluating driving of a vehicle by a driver is provided.

The invention is not limited to the foregoing embodiments, and various variations/changes are possible within the spirit of the invention.

What is claimed is:

1. A non-transitory computer-readable storage medium comprising a program executed on a mobile terminal, wherein: the program is a program for safe driving support related to driving of a vehicle; the mobile terminal is associated with an individual driver; and the mobile terminal comprises: one or more processors; and a memory storing instructions which, when the instructions are executed by the one or more processors, cause the mobile terminal to function as: an acquisition unit configured to acquire acceleration detected by a sensor of the mobile terminal disposed in a vehicle or a sensor provided in the vehicle as acceleration of the vehicle while driving, a determination unit configured to determine a rank related to a risk level of driving by a driver of the vehicle on the basis of acceleration of the vehicle, and a display control unit configured to cause a display to show a display according to the determined rank;

wherein the instructions further cause the mobile terminal to function as an evaluation unit configured to evaluate driving by a driver of the vehicle on the basis of acceleration of the vehicle;

the determination unit determines the rank related to the risk level of the driver on the basis of a comparison between a driving evaluation result by the driver and driving evaluation results of a plurality of drivers based on past travel histories of the plurality of drivers, the comparison further comprising comparing the occurrence frequency of each acceleration by the driver with the occurrence frequency of accelerations of the plurality of drivers on the basis of the past travel histories of the plurality of drivers; and the evaluation unit evaluates driving by the driver by measuring at least an occurrence frequency of an event in which acceleration greater than or equal to than a first predetermined value occurs and an occurrence frequency of an event in which acceleration greater than or equal to than a second predetermined value smaller than the first predetermined value occurs, wherein the instructions further cause the mobile terminal to function as an evaluation unit configured to evaluate driving by a driver of the vehicle on the basis of acceleration of the vehicle, and wherein the determination unit determines a rank related to the risk level of the driver on the basis of a comparison between a driving evaluation result by the driver and driving evaluation results of a plurality of drivers based on past travel histories of the plurality of drivers, wherein the evaluation unit further evaluates driving by the driver by measuring at least an occurrence frequency of an event in which acceleration equal to or greater than a first predetermined value occurs and an occurrence frequency of an event in which acceleration equal to or greater than a second predetermined value smaller than the first predetermined value occurs.

2. The non-transitory computer-readable storage medium according to claim 1, wherein the acquisition unit further acquires a position detected by a sensor of the mobile terminal or a sensor provided in the vehicle as a position of the vehicle, and the determination unit recalculates the rank of the risk level of the driver for each predetermined travel distance.

3. The non-transitory computer-readable storage medium according to claim 1, wherein when the vehicle is moving, the display control unit causes the display to display a relative variation of a rank related to the risk level of the driver.

4. The non-transitory computer-readable storage medium according to claim 1, wherein when the vehicle is stopped, the display control unit causes the display to display a numerical value indicating a rank related to the risk level of the driver.

5. The non-transitory computer-readable storage medium according to claim 4, wherein when the vehicle is stopped, the display control unit further causes the display to display a transition in a predetermined period of a rank related to the risk level of the driver.

6. The non-transitory computer-readable storage medium according to claim 1, wherein the display control unit switches whether or not to display a transition in a predetermined period of a rank related to the risk level of the driver depending on whether the vehicle is moving or stopped.

7. The non-transitory computer-readable storage medium according to claim 1, wherein when the rank related to the risk level of the driver is lower than a predetermined rank, the display control unit causes the display to show a display according to the determined rank by using a display color different from a display color when the rank is equal to or higher than the predetermined rank.

8. The non-transitory computer-readable storage medium according to claim 1, wherein when the rank related to the risk level of the driver is equal to or higher than a predetermined rank, the display control unit causes the display to show a display according to the determined rank by using a display color different from a display color when the rank is lower than the predetermined rank.

9. The non-transitory computer-readable storage medium according to claim 1, wherein the acquisition unit further acquires a moving speed detected by a sensor of the mobile terminal or a sensor provided in the vehicle as a vehicle speed of the vehicle, and the determination unit recalculates the rank related to the risk level of the driver each time the vehicle stops.

10. A mobile terminal used for safe driving support related to driving of a vehicle and associated with an individual driver, the mobile terminal comprising:

one or more processors; and a memory storing instructions which, when the instructions are executed by the one or more processors, cause the mobile terminal to function as:

an acquisition unit configured to acquire acceleration detected by a sensor of the mobile terminal disposed in a vehicle while driving or a sensor provided in the vehicle as acceleration of the vehicle;

a determination unit configured to determine a rank related to a risk level of driving by a driver of the vehicle on the basis of acceleration of the vehicle; and a display control unit configured to cause a display to show a display according to the determined rank.

11. A control method of a mobile terminal used for safe driving support related to driving of a vehicle and associated with an individual driver, the method comprising:

acquiring acceleration detected by a sensor of the mobile terminal disposed in a vehicle while driving or a sensor provided in the vehicle as acceleration of the vehicle;

determining a rank related to a risk level of driving by a driver of the vehicle on the basis of acceleration of the vehicle; and causing a display to show a display according to the determined rank;

wherein the mobile terminal further evaluates driving by the driver of the vehicle on the basis of acceleration of the vehicle, and wherein the determination of the rank related to the risk level of the driver on the basis of a comparison between a driving evaluation result by the driver and driving evaluation results of a plurality of drivers based on past travel histories of the plurality of drivers, wherein the mobile terminal further evaluates driving by the driver by measuring at least an occurrence frequency of an event in which acceleration equal to or greater than a first predetermined value occurs and an occurrence frequency of an event in which acceleration equal to or greater than a second predetermined value smaller than the first predetermined value occurs, wherein the rank related to the risk level of the driver is determined on the basis of a comparison between a driving evaluation result by the driver and driving evaluation results of a plurality of drivers based on past travel histories of the plurality of drivers, the comparison further comprising comparing the occurrence frequency of each acceleration by the driver with the occurrence frequency of accelerations of the plurality of drivers on the basis of the past travel histories of the plurality of drivers; and the driving by the driver is evaluated by measuring at least an occurrence frequency of an event in which acceleration greater than or equal to a first predetermined value occurs and an occurrence frequency of an event in which acceleration greater than or equal to a second predetermined value smaller than the first predetermined value occurs.

12. A system used for safe driving support related to driving of a vehicle, the system comprising a mobile terminal and a server, wherein:

the mobile terminal is associated with an individual driver;

the server comprises:

one or more processors; and a memory storing instructions which, when the instructions are executed by the one or more processors, cause the server to function as:

an acquisition unit configured to acquire, from the mobile terminal, acceleration detected by a sensor of the mobile terminal disposed in a vehicle while driving or a sensor provided in the vehicle as acceleration of the vehicle, a determination unit configured to determine a rank related to a risk level of driving by a driver of the vehicle on the basis of acceleration of the vehicle, and a transmission unit configured to transmit information for display according to the determined rank to the mobile terminal; and the mobile terminal causes a display to display the information for display received from the server;

wherein the instructions further cause the mobile terminal to function as an evaluation unit configured to evaluate driving by a driver of the vehicle on the basis of acceleration of the vehicle;

the determination unit determines the rank related to the risk level of the driver on the basis of a comparison between a driving evaluation result by the driver and driving evaluation results of a plurality of drivers based on past travel histories of the plurality of drivers, the comparison further comprising comparing the occurrence frequency of each acceleration by the driver with the occurrence frequency of accelerations of the plurality of drivers on the basis of the past travel histories of the plurality of drivers; and the evaluation unit evaluates driving by the driver by measuring at least an occurrence frequency of an event in which acceleration greater than or equal to a first predetermined value occurs and an occurrence frequency of an event in which acceleration greater than or equal to than a second predetermined value smaller than the first predetermined value occurs, wherein the instructions further cause the mobile terminal to function as an evaluation unit configured to evaluate driving by a driver of the vehicle on the basis of acceleration of the vehicle, and wherein the determination unit determines a rank related to the risk level of the driver on the basis of a comparison between a driving evaluation result by the driver and driving evaluation results of a plurality of drivers based on past travel histories of the plurality of drivers, wherein the evaluation unit further evaluates driving by the driver by measuring at least an occurrence frequency of an event in which acceleration equal to or greater than a first predetermined value occurs and an occurrence frequency of an event in which acceleration equal to or greater than a second predetermined value smaller than the first predetermined value occurs.

* * * * *